(12) United States Patent
Jing et al.

(10) Patent No.: US 12,339,467 B2
(45) Date of Patent: Jun. 24, 2025

(54) DISPLAY ASSEMBLY, METHOD FOR ASSEMBLING SAME, AND WEARABLE DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Haoran Jing, Beijing (CN); Zhenxing Zhou, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 837 days.

(21) Appl. No.: 17/388,106

(22) Filed: Jul. 29, 2021

(65) Prior Publication Data

US 2022/0155495 A1  May 19, 2022

(30) Foreign Application Priority Data

Nov. 17, 2020  (CN) .......................... 202011286247.6

(51) Int. Cl.
*G02B 3/00* (2006.01)
*G02B 3/04* (2006.01)
(Continued)

(52) U.S. Cl.
CPC .......... *G02B 3/0037* (2013.01); *G02B 3/0075* (2013.01); *G02B 3/04* (2013.01); *G02B 5/005* (2013.01); *G06F 3/011* (2013.01)

(58) Field of Classification Search
CPC ...... G02B 3/0037; G02B 3/0075; G02B 3/04; G02B 5/005; G02B 27/0172;
(Continued)

(56) References Cited

U.S. PATENT DOCUMENTS

2007/0008484 A1  1/2007  Jannard
2013/0187836 A1*  7/2013  Cheng ...................... G02B 5/04
345/8
(Continued)

FOREIGN PATENT DOCUMENTS

CN  101156104 A  4/2008
CN  101470262 A  7/2009
(Continued)

OTHER PUBLICATIONS

English translation of CN106990538 (Year: 2017).*
First office action of Chinese application No. 202011286247.6 issued on Jan. 5, 2022.

*Primary Examiner* — Thomas K Pham
*Assistant Examiner* — Kuei-Jen L Edenfield
(74) *Attorney, Agent, or Firm* — Lippes Mathias LLP (57) ABSTRACT

A display assembly is provided. The display assembly includes a fixing housing, a plurality of first lens structures, and a plurality of display modules. The fixing housing is provided with a plurality of through holes. The plurality of first lens structures one-to-one correspond to the plurality of through holes, and the plurality of display modules one-to-one correspond to the plurality of first lens structures. The plurality of display modules include at least two display modules being spliced with each other, and light emitted by each of the display modules is emitted through a corresponding first lens structure.

16 Claims, 5 Drawing Sheets

(51) Int. Cl.
*G02B 5/00* (2006.01)
*G06F 3/01* (2006.01)

(58) Field of Classification Search
CPC ........ G02B 2027/0123; G02B 27/0176; G02B 3/00; G02B 5/00; G02B 27/01; G06F 3/011; G06F 3/01; G03B 30/00
USPC ........ 359/703–708, 811–830, 694–718, 477, 359/811–830
See application file for complete search history.

(56) References Cited

U.S. PATENT DOCUMENTS

| | | |
|---|---|---|
| 2016/0370589 A1 | 12/2016 | Wang et al. |
| 2017/0227770 A1 | 8/2017 | Carollo et al. |
| 2017/0337857 A1 | 11/2017 | Tiberi et al. |
| 2018/0217637 A1* | 8/2018 | Zou ...................... G06T 19/006 |

FOREIGN PATENT DOCUMENTS

| | | | | |
|---|---|---|---|---|
| CN | 105572831 A | | 5/2016 | |
| CN | 105589302 A | | 5/2016 | |
| CN | 106990538 A | * | 7/2017 | ......... G02B 27/0172 |
| CN | 107077011 A | | 8/2017 | |
| CN | 206540076 U | | 10/2017 | |
| CN | 107462994 A | | 12/2017 | |
| CN | 108205183 A | | 6/2018 | |
| CN | 209728335 U | | 12/2019 | |
| CN | 111323921 A | | 6/2020 | |

* cited by examiner

DISPLAY ASSEMBLY, METHOD FOR ASSEMBLING SAME, AND WEARABLE DISPLAY DEVICE

This application claims priority to Chinese Patent Application No. 202011286247.6, filed on Nov. 17, 2020 and entitled "DISPLAY ASSEMBLY, METHOD FOR ASSEMBLING SAME, AND WEARABLE DISPLAY DEVICE," the disclosure of which is herein incorporated by reference in its entirety.

TECHNICAL FIELD

The present disclosure relates to the field of display technologies, and in particular, relates to a display assembly, a method for assembling same, and a wearable display device.

BACKGROUND

A wearable display device refers to a portable display device that can be directly worn on the body of a user or integrated onto clothes or accessories of the user. The user may wear the wearable display device, and watch movies or play games using the wearable display device.

In the related art, the wearable display device includes a display assembly and a casing for encapsulating the display assembly, wherein the display assembly may be configured to display an image.

SUMMARY

Embodiments of the present disclosure provide a display assembly, a method for assembling same, and a wearable display device.

In one aspect of the embodiments of the present disclosure, a display assembly is provided. The display assembly includes:

a fixing housing provided with a plurality of through holes;

a plurality of first lens structures one-to-one corresponding to the plurality of through holes, wherein each of the first lens structures is fixed in a corresponding through hole of the plurality of through holes; and a plurality of display modules one-to-one corresponding to the plurality of first lens structures, wherein the plurality of display modules are fixedly connected to the fixing housing, the plurality of display modules include at least two display modules being spliced with each other, and light emitted by each of the display modules is emitted through a corresponding first lens structure of the plurality of first lens structures.

In some embodiments, a gap is defined between a side wall of at least one of the first lens structures and an inner wall of the corresponding through hole of the plurality of through holes; and the display assembly further includes: one or more adjustment diaphragms, wherein each of the one or more adjustment diaphragms is disposed in the gap, and one side of each of the one or more adjustment diaphragms is in contact with the side wall of the first lens structure, and the other side of the adjustment diaphragm is in contact with the inner wall of the through hole.

In some embodiments, the first lens structure is provided with a plurality of side walls, the through hole is provided with a plurality of inner walls one-to-one corresponding to the plurality of side walls, a gap being defined between each side wall and a corresponding inner wall; and the display assembly includes a plurality of adjustment diaphragms, each gap being provided with one adjustment diaphragm.

In some embodiments, at least two of the plurality of adjustment diaphragms have different thicknesses.

In some embodiments, one side of each of the one or more adjustment diaphragms is bonded to the side wall of the first lens structure, and the other side of the adjustment diaphragm is bonded to the inner wall of the through hole.

In some embodiments, the first lens structure is provided with four side walls, and the through hole is provided with four inner walls.

In some embodiments, the fixing housing includes a first housing structure, a second housing structure, and a connection structure fixedly connected to both of the first housing structure and the second housing structure, each of the first housing structure and the second housing structure provided with a plurality of through holes.

In some embodiments, the first housing structure, the second housing structure, and the connection structure are defined as an integral structure.

In some embodiments, the plurality of display modules include a plurality of first display modules connected to the first housing structure and a plurality of second display modules connected to the second housing structure; and a number of through holes of the first housing structure is the same as a number of the first display modules, and a number of through holes of the second housing structure is the same as a number of the second display modules.

In some embodiments, the first housing structure is provided with six through holes, and the second housing structure is provided with six through holes; and the plurality of display modules includes six first display modules and six second display modules, wherein the six first display modules are spliced with each other, and the six second display modules are spliced with each other.

In some embodiments, the display assembly further includes a first fixing member;

the first fixing member is fixedly connected to the plurality of display modules, and the first fixing member is fixedly connected to the fixing housing.

In some embodiments, the first fixing member includes a module cover plate and a module bracket; wherein the module cover plate and the module bracket are respectively disposed at two sides of the display module and configured for fixing the display module; and the module cover plate and the module bracket are both fixedly connected to the fixing housing.

In some embodiments, each of the display modules includes a flexible circuit board; and the module cover plate is provided with a plurality of first openings and a plurality of grooves, wherein the flexible circuit boards of part of the plurality of display modules are disposed in the first openings, and the flexible circuit boards of the other part of the plurality of display modules are disposed in the grooves.

In some embodiments, the module bracket is provided with a plurality of second openings, and light emitted by the plurality of display modules is emitted through the second openings.

In some embodiments, the display assembly further includes a second lens structure and a second fixing member fixedly connected to the second lens structure, wherein the second lens structure and the second fixing member are both disposed on a side of the fixing housing distal from the plurality of display modules, and the second fixing member is fixedly connected to the fixing housing.

In some embodiments, the first lens structure is an aspherical lens, and the second lens structure is a free-form-surface lens.

In another aspect of the embodiments of the present disclosure, a method for assembling a display assembly is provided. The method includes:

acquiring a fixing housing, a plurality of first lens structures, and a plurality of display modules, wherein the fixing housing is provided with a plurality of through holes, the plurality of first lens structures one-to-one correspond to the plurality of through holes, the plurality of display modules one-to-one correspond to the plurality of first lens structures, and the plurality of display modules include at least two display modules being spliced with each other;

fixing each of the first lens structures in a corresponding through hole of the plurality of through holes; and connecting the plurality of display modules to the fixing housing, such that light emitted by each of the display modules is emitted through a corresponding first lens structure of the plurality of first lens structures.

In some embodiments, a gap is defined between a side wall of the first lens structure and an inner wall of the corresponding through hole of the plurality of through holes;

fixing each of the first lens structures in the corresponding through hole of the plurality of through holes includes:

acquiring one or more adjustment diaphragms;

disposing each of the one or more adjustment diaphragms in one gap, such that one side of each of the one or more adjustment diaphragms is in contact with the side wall of the first lens structure, and the other side of the adjustment diaphragm is in contact with the inner wall of the through hole.

In response to disposing each of the one or more adjustment diaphragms in one gap, such that one side of each of the one or more adjustment diaphragms is in contact with the side wall of the first lens structure, and the other side of the adjustment diaphragm is in contact with the inner wall of the through hole, the method further includes:

bonding one side of the adjustment diaphragm to the side wall of the first lens structure by an adhesive, and bonding the other side of the adjustment diaphragm to the inner wall of the through hole by an adhesive.

In yet another aspect of the embodiments of the present disclosure, a wearable display device is provided. The wearable display device includes a casing and a display assembly; wherein the casing is configured to encapsulate the display assembly; and the display assembly includes:

a fixing housing provided with a plurality of through holes;

a plurality of first lens structures one-to-one corresponding to the plurality of through holes, wherein each of the first lens structures is fixed in a corresponding through hole of the plurality of through holes; and a plurality of display modules one-to-one corresponding to the plurality of first lens structures, wherein the plurality of display modules are fixedly connected to the fixing housing, the plurality of display modules include at least two display modules being spliced with each other, and light emitted by each of the display modules is emitted through a corresponding first lens structure of the plurality of first lens structures.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

Figure 1:
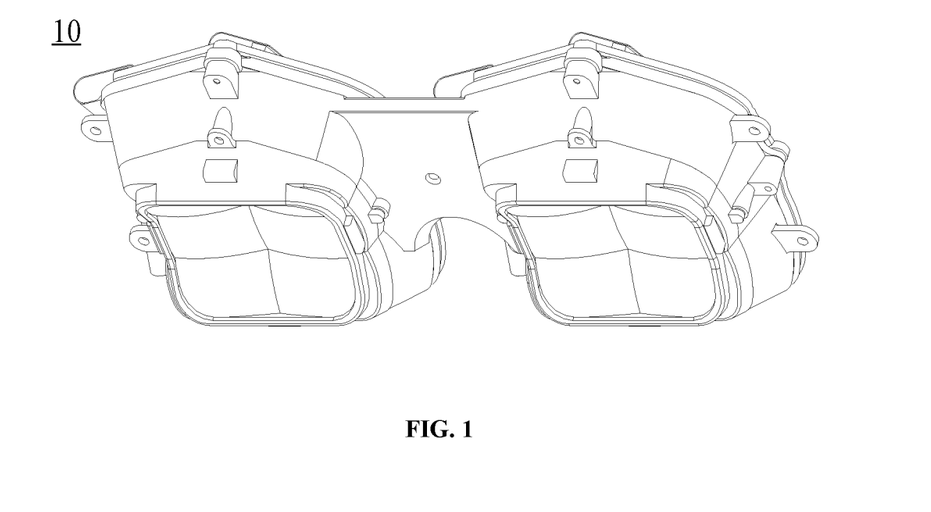
FIG. 1 is a schematic structural diagram of a display assembly according to some embodiments of the present disclosure.
Figure 2:
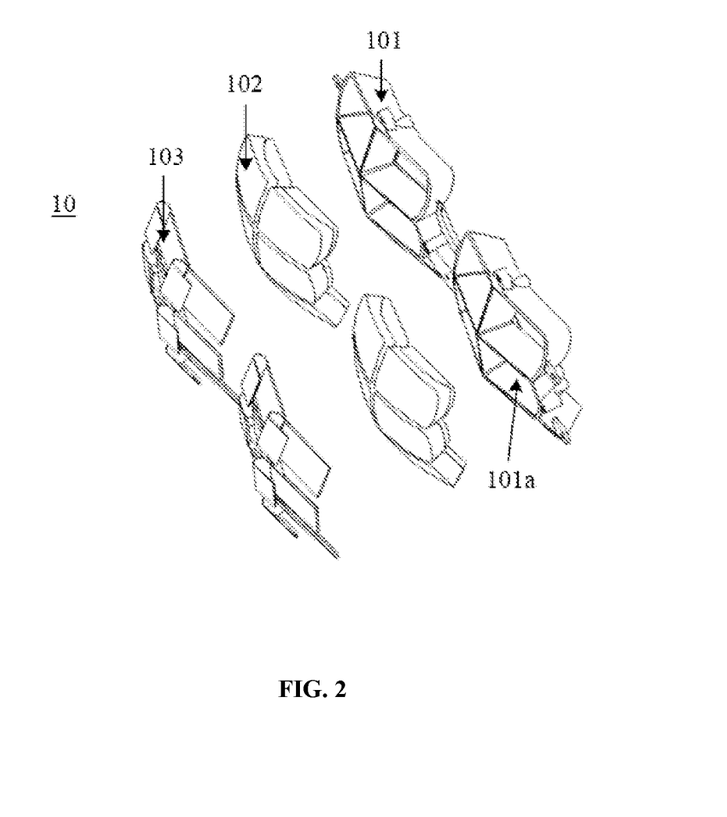
FIG. 2 is a schematic exploded diagram of the display assembly shown in FIG. 1.

FIG. 1 is a schematic structural diagram of a display assembly according to some embodiments of the present disclosure. FIG. 2 is a schematic exploded diagram of the display assembly shown in FIG. 1. As can be seen from a combination of FIG. 1 and FIG. 2, the display assembly 10 may include a fixing housing 101, a plurality of first lens structures 102, and a plurality of display modules 103. The fixing housing 101 may be provided with a plurality of through holes 101a, the plurality of first lens structures 102 may one-to-one correspond to the plurality of through holes 101a, and each first lens structure 102 may be fixed into one corresponding through hole 101a. The plurality of display modules 103 may one-to-one correspond to the plurality of first lens structures 102, and light emitted by each display module 103 may be emitted through one corresponding first lens structure 102.

In some embodiments, the plurality of display modules 103 may be fixedly connected to the fixing housing 101, and the plurality of display modules 103 include at least two display modules 103 being spliced with each other.

In the case that the size of the display assembly 10 is fixed, compared with one large display module, the size of each display module 103 of the at least two display modules 103 being spliced with each other may be smaller. Compared with the display module with high resolution and large size, the display module with high resolution and small size is easier to manufacture. Therefore, the resolution of the at least two display modules 103 (smaller in size) being spliced with each other, in the display assembly 10 according to the embodiments of the present disclosure, may be relatively high, such that the display effect of the display assembly 10 can be improved.

In summary, the embodiments of the present disclosure provide a display assembly, wherein the plurality of display modules of the display assembly include at least two display modules being spliced with each other. The size of each of the display modules in the at least two display modules being spliced with each other may be smaller, and therefore the resolution of each of the display modules may be relatively high, thereby ensuring the display effect of the display assembly.

Figure 3:
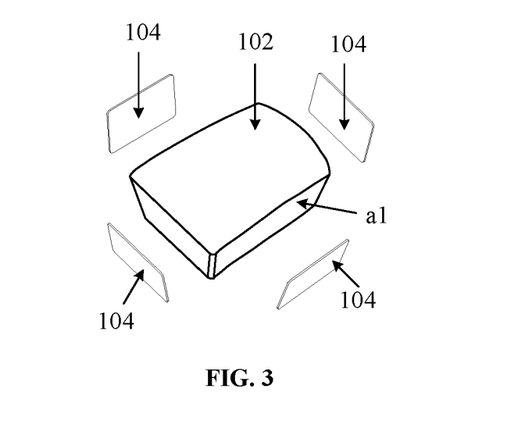
FIG. 3 is a schematic diagram of a first lens structure and an adjustment diaphragm according to some embodiments of the present disclosure.

In some embodiments, a gap is defined between a side wall a1 of at least one first lens structure 102 of the plurality of first lens structures 102 and an inner wall b1 of a corresponding through hole 101a. Referring to FIG. 3, the display assembly 10 may further include one or more adjustment diaphragms 104. Four adjustment diaphragms 104 are shown in FIG. 3. Each of the one or more adjustment diaphragms 104 may be disposed in the gap, wherein one side of the adjustment diaphragm 104 may be in contact with the side wall a1 of the first lens structure 102, and the other side of the adjustment diaphragm 104 may be in contact with the inner wall b1 of the through hole 101a. Thus, the adjustment diaphragm 104 can fix the first lens structure 102 in the through hole 101a, and the shaking of the first lens structure 102 in the through hole 101a can be avoided, thereby ensuring the stability of the display assembly 10.

Furthermore, by adjusting the setting position of the adjustment diaphragm 104, the position of the first lens structure 102 in the corresponding through hole 101a may be adjusted, and therefore the clarity of the image displayed by the display assembly 10 is adjusted.

Figure 4:
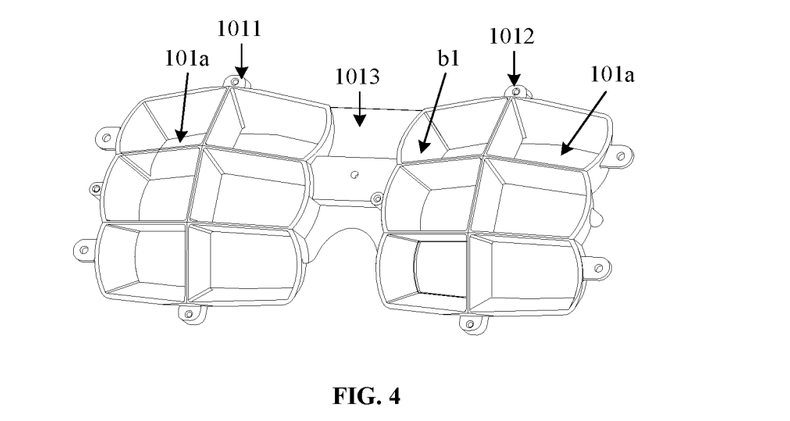
FIG. 4 is a schematic structural diagram of a fixing housing according to some embodiments of the present disclosure.

Referring to FIG. 3, it can be seen that the first lens structure 102 may be provided with a plurality of side walls a1. Referring to FIG. 4, the through hole 101a may be provided with a plurality of inner walls b1 one-to-one corresponding to the plurality of side walls a1. Thus, a shape of the first lens structure 102 matches a shape of the through hole 101a of the fixing housing 101, which facilitates the disposing of the first lens structure 102 in the through hole 101a.

Furthermore, a gap may be defined between each of the side walls a1 of the first lens structure 102 and the corresponding inner wall b1 in the through hole 101a. The display assembly 10 may include a plurality of adjustment diaphragms 104, wherein each gap is provided with one adjustment diaphragm 104. Two sides of each of the adjustment diaphragms 104 are respectively in contact with the side wall a1 of the first lens structure 102 and the inner wall b1 of the through hole 101a, so as to ensure that the first lens structure 102 may not shake in the through hole 101a and ensure the stability of the display assembly 10.

In some embodiments, referring to FIG. 3, the first lens structure 102 may be provided with four side walls a1. Referring to FIG. 4, the through hole 101a of the fixing housing 101 may be provided with four inner walls b1. Thus, the shape of the first lens structure 102 may be quadrilateral, and the shape of the through hole 101a of the fixing housing 101 may also be quadrilateral. The first lens structure 102 may have other shapes, and the through hole 101a may also have other shapes, as long as the shape of the first lens structure 102 matches the shape of the through hole 101a.

In some embodiments, the size of the through hole 101a of the fixing housing 101 may be greater than the size of the first lens structure 102, such that a gap is defined between each of the side walls a1 of the first lens structure 102 and the corresponding inner wall b1 of the through hole 101a. In the process of assembling the display assembly 10, adjustment diaphragms 104 with different thicknesses may be disposed between the first lens structure 102 and the through hole 101a of the fixing housing 101 to precisely adjust the position of the first lens structure 102 in the through hole 101a of the fixing housing 101, thereby facilitating adjusting the clarity of the image displayed by the display assembly 10.

In some embodiments, in the plurality of adjustment diaphragms 104 included in the display assembly 10, at least two adjustment diaphragms 104 may have different thicknesses. In the plurality of adjustment diaphragms 104 included in the display assembly 10, the thickness of each of the adjustment diaphragms 104 may also be equal, which is not limited in the embodiments of the present disclosure.

In some embodiments, one side of each of the adjustment diaphragms 104 may be bonded to the side wall a1 of the first lens structure 102, and the other side of the adjustment diaphragm 104 may be bonded to the inner wall b1 of the through hole 101a. That is, the first lens structure 102 and the fixing housing 101 may be fixedly connected through the adjustment diaphragm 104, thereby ensuring the display effect of the display assembly 10.

Referring to FIG. 4, it can be seen that the fixing housing 101 may include a first housing structure 1011, a second housing structure 1012, and a connection structure 1013 fixedly connected to both of the first housing structure 1011 and the second housing structure 1012.

Each of the first housing structure 1011 and the second housing structure 1012 may be provided with a plurality of through holes 101a. Optionally, a number of the through holes 101a of the first housing structure 1011 may be the same as a number of the through holes 101a of the second housing structure 1012. For example, referring to FIG. 4, the first housing structure 1011 may be provided with six through holes 101a, and the second housing structure 1012 may also be provided with six through holes 101a. The number of the through holes 101a of the first housing structure 1011 may be different from the number of the through holes 101a of the second housing structure 1012, which is not limited in the embodiments of the present disclosure.

In some embodiments, the number of the first lens structures 102 disposed in the through holes 101a of the first housing structure 1011 may be the same as the number of the through holes 101a of the first housing structure 1011. The number of the first lens structures 102 disposed in the through holes 101a of the second housing structure 1012 may be the same as the number of the through holes 101a of the second housing structure 1012.

Figure 5:
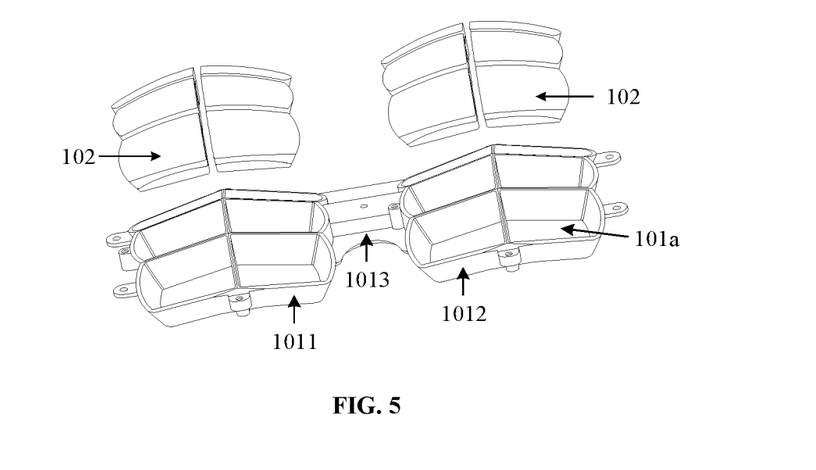
FIG. 5 is a schematic diagram of a fixing housing and a first lens structure according to some embodiments of the present disclosure.

In some embodiments, referring to FIG. 5, the first housing structure 1011 is provided with six through holes 101a, and the second housing structure 1012 is provided with six through holes 101a. Correspondingly, one first lens structure 102 may be disposed in each of the six through holes 101a of the first housing structure 1011, that is, the first housing structure 1011 may be configured to be connected to six first lens structures 102. One first lens structure 102 may be disposed in each of the six through holes 101a of the second housing structure 1012, that is, the second housing structure 1012 may be configured to be connected to six first lens structures 102.

In some embodiments, the plurality of display modules 103 includes a plurality of first display modules and a plurality of second display modules. Each of the first display modules is connected to the first housing structure 1011, and each of the second display modules is connected to the second housing structure 1012.

The number of the first display modules connected to the first housing structure 1011 may be the same as the number of the through holes 101a of the first housing structure 1011. The number of the second display modules connected to the second housing structure 1012 may be the same as the number of the through holes 101a of the second housing structure 1012.

In some embodiments, the first housing structure 1011 is provided with six through holes 101a, and the second housing structure 1012 is provided with six through holes 101a. The plurality of display modules 103 may include six first display modules and six second display modules. The six first display modules are spliced with each other in 3 rows and 2 columns, and the six first display modules are fixedly connected to the first housing structure 1011. Each of the first display modules corresponds to one of the six first lens structures 102 connected to the first housing structure 1011. The six second display modules are spliced with each other in 3 rows and 2 columns, and the six second display modules are fixedly connected to the second housing structure 1012. Each of the second display modules corresponds to one of the six first lens structures 102 connected to the second housing structure 1012.

In the case where a size of the first housing structure 1011 is fixed, compared with a large display module, the size of each of the six mutually spliced first display modules disposed on the first housing structure 1011 may be smaller and the resolution thereof may be relatively high, which can improve the display effect of the display assembly 10. Moreover, in the case where a size of the second housing structure 1012 is fixed, compared with a large display module, the size of each of the six mutually spliced second display modules disposed on the second housing structure 1012 may be smaller and the resolution thereof may be relatively high, which can improve the display effect of the display assembly 10.

In some embodiments, the first housing structure 1011, the second housing structure 1012, and the connection structure 1013 may be defined as an integral structure. That is, the first housing structure 1011, the second housing structure 1012, and the connection structure 1013 may be prepared by a one preparation process.

By defining the first housing structure 1011, the second housing structure 1012, and the connection structure 1013 as an integral structure, the assembly error between the first housing structure 1011 and the first lens structure 102 and the assembly error between the second housing structure 1012 and the first lens structure 102 can be reduced, thereby ensuring the display effect of the display assembly 10.

In some embodiments, the first housing structure 1011, the second housing structure 1012, and the connection structure 1013 may be prepared separately. Moreover, in response to respective preparations being completed, the first housing structure 1011, the second housing structure 1012, and the connection structure 1013 are fixedly connected.

Figure 6:
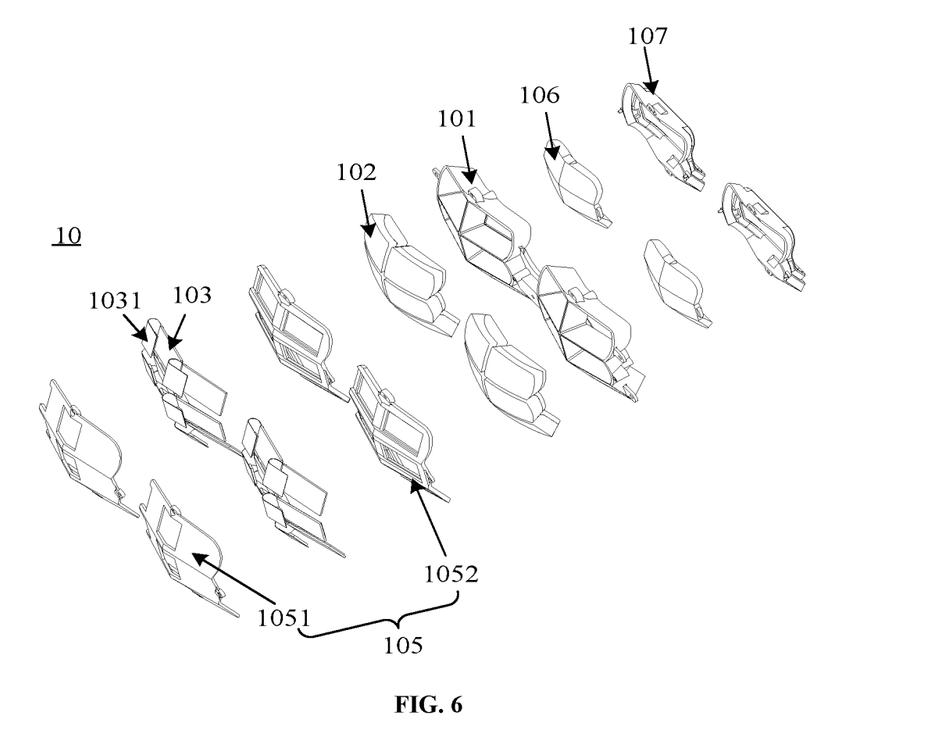
FIG. 6 is a schematic structural diagram of another display assembly according to some embodiments of the present disclosure.

FIG. 6 is a schematic structural diagram of another display assembly according to embodiments of the present disclosure. Referring to FIG. 6, it can be seen that the display assembly 10 may further include a first fixing member 105. The first fixing member 105 may be fixedly connected to the display module 103, and the first fixing member 105 may be fixedly connected to the fixing housing 101. That is, the display module 103 and the fixing housing 101 may be connected through the first fixing member 105.

In some embodiments, the fixing housing 101 includes the first housing structure 1011 and the second housing structure 1012. In order to facilitate the fixing of the plurality of first display modules connected to the first housing structure 1011 and facilitate the fixing of the plurality of second display modules connected to the second housing structure 1012, the display assembly may include two first fixing members 105. One first fixing member 105 may be configured to fixedly connect the plurality of first display modules to the first housing structure 1011, and the other first fixing member 105 may be configured to fixedly connect the plurality of second display modules to the second housing structure 1012.

Referring to FIG. 6, the first fixing member 105 may include a module cover plate 1051 and a module bracket 1052. The module cover plate 1051 and the module bracket 1052 may be respectively disposed on two sides of the display modules 103 and configured for fixing the display modules 103. In addition, the module cover plate 1051 and the module bracket 1052 are both fixedly connected to the fixing housing 101. The display surfaces of the plurality of display modules 103 may all face towards the module bracket 1052, and the non-display surfaces thereof may face towards the module cover plate 1051.

Figure 7:
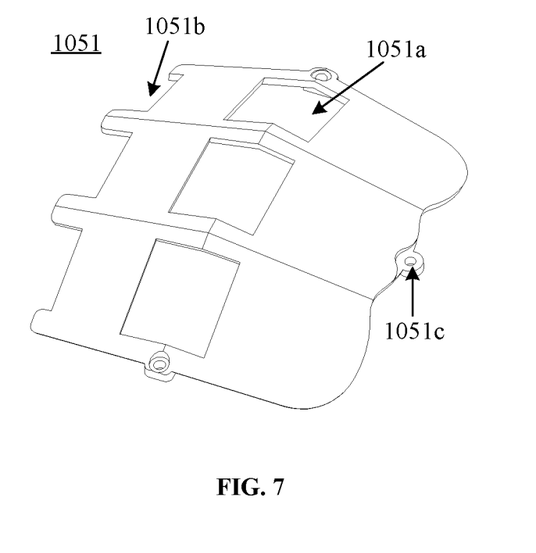
FIG. 7 is a schematic structural diagram of a module cover plate according to some embodiments of the present disclosure.
Figure 8:
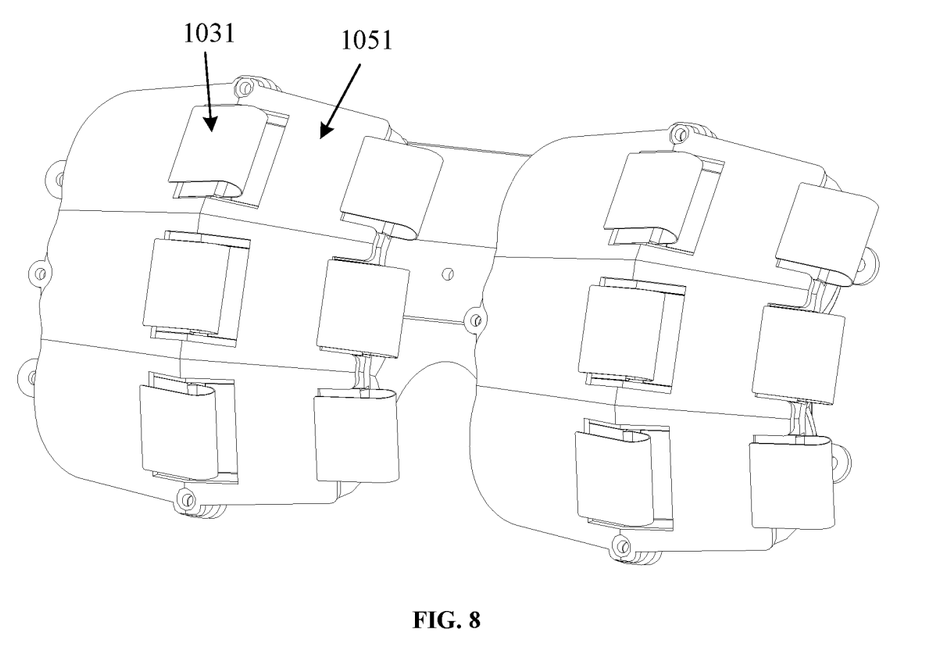
FIG. 8 is a rear view of the display assembly shown in FIG. 1.

FIG. 7 is a schematic structural diagram of a module cover plate according to embodiments of the present disclosure. Referring to FIG. 7, it can be seen that the module cover plate 1051 may be provided with a plurality of first openings 1051a and a plurality of grooves 1051b. The plurality of display modules 103 may include flexible circuit boards 1031 on the non-display surfaces of the plurality of display modules. Referring to FIG. 8, by providing the first openings 1051a and the grooves 1051b on the module cover plate 1051, the flexible circuit boards 1031 of part of the plurality of display modules 103 may be disposed in the first openings 1051a, and the flexible circuit boards 1031 of the other part of the plurality of display modules 103 are disposed in the grooves 1051b, which facilitates the assembly of the display modules 103 and the module cover plate 1051.

In some embodiments, referring to FIG. 7, the module cover plate 1051 may be provided with three first openings 1051a and three grooves 1051b, wherein the arrangement direction of the three first openings 1051a is parallel to the arrangement direction of the three grooves 1051b.

Figure 9:
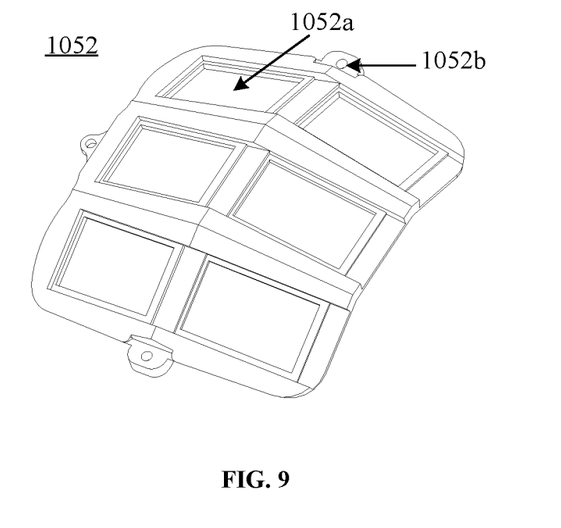
FIG. 9 is a schematic structural diagram of a module bracket according to some embodiments of the present disclosure.

FIG. 9 is a schematic structural diagram of a module bracket according to embodiments of the present disclosure. Referring to FIG. 9, it can be seen that the module bracket 1052 may be provided with a plurality of second openings 1052 a. The display surfaces of the plurality of display modules 103 face towards the module bracket 1052, and therefore by providing the second openings 1052a on the module bracket 1052, the light emitted by the display modules 103 may be easily emitted through the second openings 1052a.

In some embodiments, referring to FIG. 9, the module bracket 1052 may be provided with six second openings 1052a arranged in 3 rows and 2 columns.

In some embodiments, referring to FIG. 7, the module cover plate 1051 may be provided with a plurality of first connection holes 1051c (three first connection holes 1051c are shown in FIG. 7). Referring to FIG. 9, the module bracket 1052 may be provided with a plurality of second connection holes 1052b one-to-one corresponding to the plurality of first connection holes 1051c (three second connection holes 1052b are shown in FIG. 9). In addition, the fixing housing 101 may be provided with third connection holes (not shown in the drawings) one-to-one corresponding to the plurality of first connection holes 1051c. One screw may be disposed in each of the first connection holes 1051c, a corresponding second connection hole 1052b, and a corresponding third connection hole; and the module cover plate 1051, the module bracket 1052 and the fixing housing 101 may be connected through the screw.

Referring to FIG. 6, it can also be seen that, the display assembly 10 may further include a second lens structure 106 and a second fixing member 107 fixedly connected to the second lens structure 106. The second lens structure 106 and the second fixing member 107 are both disposed on a side of the fixing housing 101 distal from the plurality of display modules 103, and the second fixing member 107 may be fixedly connected to the fixing housing 101. In this way, the light emitted by the plurality of display modules 103 may be emitted through the second openings 1052a of the module bracket 1052, the first lens structure 102 and the second lens structure 106 in sequence.

Furthermore, by fixing the second lens structure 106 through the second fixing member 107, it may be ensured that the second lens structure 106 is fixed relative to the fixing housing 101, thereby ensuring the display effect of the display assembly 10. Optionally, the second lens structure 106 may be bonded to the second fixing member 107 by an adhesive to ensure the reliability of the connection between the second lens structure 106 and the second fixing member 107.

In some embodiments, the fixing housing 101 includes a first housing structure 1011 and a second housing structure 1012. Accordingly, referring to FIG. 6, the display assembly 10 may include two second fixing members 107 and two second lens structures 106. One second fixing member 107 may be respectively fixedly connected to one second lens structure 106 and the first housing structure 1011, and the other second fixing member 107 may be respectively fixedly connected to one second lens structure 106 and the second housing structure 1012.

In some embodiments, the first lens structure 102 may be an aspherical lens, and the second lens structure 106 may be a free-form-surface lens.

In some embodiments, the second fixing member 107 may be provided with a plurality of fourth connection holes (not shown in the drawings), and the fixing housing 101 may be provided with fifth connection holes (not shown in the drawings) one-to-one corresponding to the plurality of fourth connection holes. One screw may be disposed in each of the fourth connection holes and the corresponding fifth connection hole, and the second fixing member 107 and the fixing housing 101 may be connected through the screw.

In some embodiments, the module cover plate 1051 and the module bracket 1052 of the first fixing member 105, and the second fixing member 107 in the display assembly 10 may all be made of a metal material. Due to the good thermal conductivity of the metal material, the heat generated by the plurality of display modules 103 during displaying images may be dispersed on the module cover plate 1051, the module bracket 1052, and the second fixing member 107, which can avoid local excessively high temperature of the display assembly 10, and improve the reliability of the display assembly 10.

In summary, the embodiments of the present disclosure provide a display assembly, and the plurality of display modules of the display assembly include at least two display modules being spliced with each other. The size of each of the at least two display modules being spliced with each other may be smaller, and therefore the resolution of each of the display modules may be relatively high, thereby ensuring the display effect of the display assembly.

Figure 10:
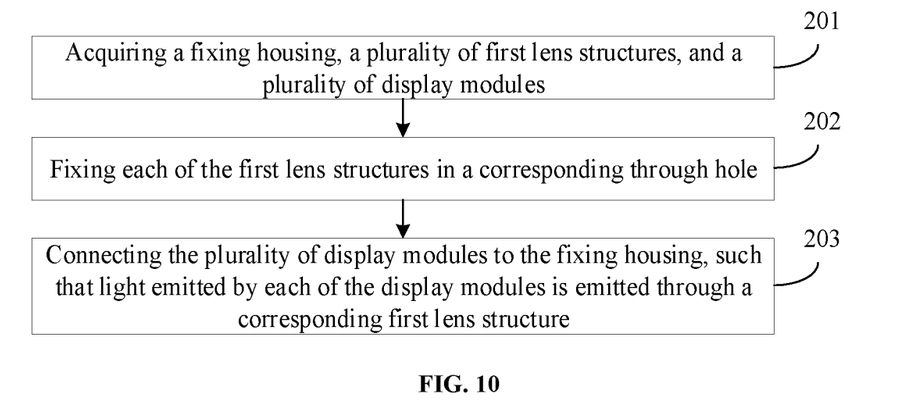
FIG. 10 is a flowchart of a method for assembling a display assembly according to some embodiments of the present disclosure.

FIG. 10 is a flowchart of a method for assembling a display assembly according to embodiments of the present disclosure. Referring to FIG. 10, it can be seen that the method may include the following processes.

In process 201, a fixing housing, a plurality of first lens structures, and a plurality of display modules are acquired.

In some embodiments, the fixing housing 101 may be provided with a plurality of through holes 101a, and the plurality of first lens structures 102 may one-to-one correspond to the plurality of through holes 101a, and the plurality of display modules 103 may one-to-one correspond to the plurality of first lens structures 102. The plurality of display modules 103 include at least two display modules 103 being spliced with each other.

In process 202, each of the first lens structures is fixed in a corresponding through hole.

In some embodiments, each of the plurality of first lens structures 102 may be respectively fixed in a corresponding through hole 101a. Compared with the solution that a plurality of first lens structures 102 are firstly assembling into an integral body and then the integral body composed of the plurality of first lens structures 102 is connected to the fixing housing 101, the solution according to the embodiments of the present disclosure can ensure the assembly accuracy between each of the first lens structures 102 and the fixing housing 101. One corresponding first lens structure 102 is fixed in each of the through holes 101a of the fixing housing 101.

In some embodiments, in the case where the size of the through hole 101a is equal to the size of the first lens structure 102, in response to the first lens structure 102 being disposed in the through hole 101a, no gap is defined between the side walls a1 of the first lens structure 102 and the inner walls b1 of a corresponding through hole 101a (that is, the side walls a1 of the first lens structure 102 are in contact with the inner walls b1 of the corresponding through hole 101a). In order to ensure the reliability of the connection between the first lens structure 102 and the fixing housing 101, the first lens structure 102 may be bonded to the through hole 101a by an adhesive.

In some embodiments, in the case where the size of the through hole 101a may be greater than the size of the first lens structure 102, in response to the first lens structure 102 being disposed in the through hole 101a, a gap is defined between the side walls a1 of the first lens structure 102 and a corresponding through hole 101a. In this case, one or more adjustment diaphragms 104 may be acquired, and each of the one or more adjustment diaphragms 104 is disposed between the side wall a1 of the first lens structure 102 and the corresponding through hole 101a, such that one side of each of the one or more adjustment diaphragms 104 is in contact with the side wall a1 of the first lens structure 102, and the other side of the adjustment diaphragm 104 is in contact with the inner wall b1 of the through hole 101a.

In some embodiments, in order to ensure the reliability of the connection between the first lens structure 102 and the fixing housing 101, one side of the adjustment diaphragm 104 may be bonded to the side wall a1 of the first lens structure 102 by an adhesive, and the other side of the adjustment diaphragm 104 may be bonded to the inner wall b1 of the through hole 101a by an adhesive.

In some embodiments, the first lens structure 102 is provided with a plurality of side walls a1, and the through hole 101a of the fixing housing 101 is provided with a plurality of inner walls b1 one-to-one corresponding to the plurality of side walls a1. By making the size of the through hole 101a greater than the size of the first lens structure 102, a gap is defined between each of the side walls a1 of the first lens structure 102 and the corresponding inner wall b1. Therefore, a plurality of adjustment diaphragms 104 with different thicknesses may be prepared in advance, and the position of the first lens structure 102 in the through hole 101a may be adjusted by disposing the adjustment diaphragms 104 with different thicknesses between the side wall a1 of the first lens structure 102 and the inner wall b1 of the through hole 101a.

In response to determining that the image displayed by the display assembly 10 achieves a better clarity as the first lens structure 102 is at a certain position, one side of the adjustment diaphragm 104 currently disposed between the side wall a1 and the inner wall b1 may be bonded to the side wall a1 of the first lens structure 102, and the other side thereof is bonded to the inner wall b1 of the through hole 101a. That is, the adjustment diaphragms 104 with different thicknesses may be disposed between the side wall a1 of the first lens structure 102 and the inner wall b1 of the through hole 101a, and therefore the position of the first lens structure 102 relative to the through hole 101a may be adjusted, thus adjusting the clarity of the image displayed by the display module 103.

In some embodiments, the first lens structure 102 is provided with four side walls a1, and the through hole 101a of the fixing housing 101 is provided with four inner walls b1. Therefore, one adjustment diaphragm 104 may be disposed between each of the four side walls a1 of the first lens structure 102 and the corresponding inner wall b1 of the through hole 101a. The thicknesses of the four disposed adjustment diaphragms 104 may be equal or different, which is not limited in the embodiments of the present disclosure, as long as it is ensured that one side of each of the adjustment diaphragms 104 is in contact with the side wall a1 of the first lens structure 102 and the other side thereof is in contact with the inner wall b1 of the through hole 101a.

In process 203, a plurality of display modules are connected to the fixing housing, such that light emitted by each of the display modules is emitted through a corresponding first lens structure.

In some embodiments, the plurality of display modules 103 may be connected to the fixing housing 101 through the first fixing member 105. In addition, the light emitting surface of each of the plurality of display modules 103 may face towards the first lens structure 102, so as to ensure that the light emitted by the display module 103 can be emitted through the corresponding first lens structure 102.

In summary, the embodiments of the present disclosure provide a method for assembling a display assembly, and a plurality of display modules of the display assembly include at least two display modules being spliced with each other. The size of each of the at least two display modules, which are spliced with each other, may be smaller, and therefore the resolution of each of the display modules may be relatively high, thereby ensuring the display effect of the display assembly.

Figure 11:
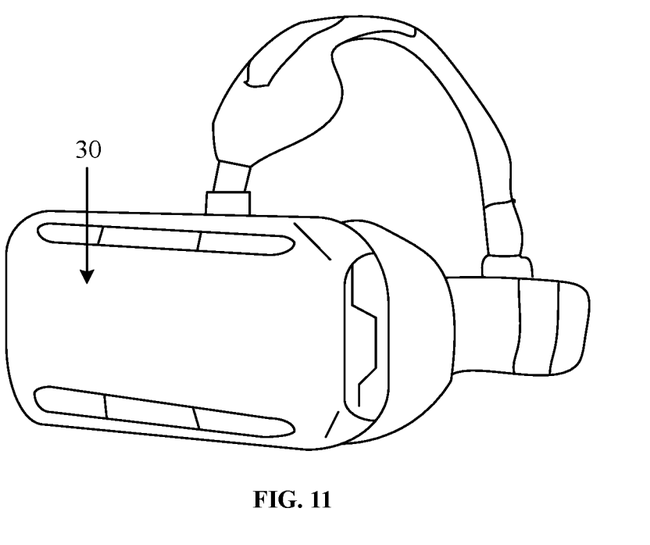
FIG. 11 is a schematic structural diagram of a wearable display device according to some embodiments of the present disclosure.

FIG. 11 is a schematic structural diagram of a wearable display device according to embodiments of the present disclosure. Referring to FIG. 11, it can be seen that the wearable display device may include a casing 30 and a display assembly 10 according to the above embodiments (the display assembly is not shown in FIG. 11). The display assembly 10 may be disposed in the casing 30, wherein the casing 30 may be configured to encapsulate the display assembly 10.

In some embodiments, the wearable display device may be a virtual reality (VR) device or an augmented reality (AR) device.

In some embodiments, the first housing structure 1011 of the fixing housing 101 in the display assembly 10, the plurality of first display modules connected to the first housing structure 1011, and the plurality of first lens structures 102 connected to the first housing structure 1011 may constitute a part of the wearable display device that configured for viewing by the left eye of the user. The second housing structure 1012, the plurality of second display modules connected to the second housing structure 1012, and the plurality of first lens structures connected to the second housing structure 1012 may constitute a part of the wearable display device that configured for viewing by the right eye of the user.

The above are only optional embodiments of the present disclosure and are not intended to limit the present disclosure. Any modification, equivalent replacement, improvement and the like made within the spirit and principle of the present disclosure shall all be included in the protection scope of the present disclosure.

What is claimed is:

1. A display assembly, comprising:
   a fixing housing provided with a plurality of through holes;
   a plurality of first lens structures in one-to-one correspondence with the plurality of through holes, wherein each of the first lens structures is disposed in a corresponding through hole of the plurality of through holes; and
   a plurality of display modules in one-to-one correspondence with the plurality of first lens structures, wherein the plurality of display modules are fixedly connected to the fixing housing, the plurality of display modules comprise at least two display modules being spliced with each other, and light emitted by each of the display modules is emitted through a corresponding first lens structure of the plurality of first lens structures;
   wherein each of the first lens structures is provided with a plurality of side walls, each of the through holes is provided with a plurality of inner walls in one-to-one correspondence with the plurality of side walls, and gaps are respectively defined between each of the side walls and a corresponding inner wall; and
   the display assembly comprises adjustment diaphragms with different thicknesses, each of the gaps being provided with an adjustment diaphragm, wherein one side of the adjustment diaphragm is in contact with a side wall of the first lens structure, and another side of the adjustment diaphragm is in contact with an inner wall of the through hole;
   a position of the first lens structure axially along the through hole is adjusted by disposing the adjustment diaphragms with different thicknesses between the side walls of the first lens structure and the inner walls of the through hole.

2. The display assembly according to claim 1, wherein one side of the adjustment diaphragm is bonded to the side wall of the first lens structure, and the another side of the adjustment diaphragm is bonded to the inner wall of the through hole.

3. The display assembly according to claim 1, wherein the first lens structure is provided with four side walls and the through hole is provided with four inner walls.

4. The display assembly according to claim 1, wherein the fixing housing comprises a first housing structure, a second housing structure, and a connection structure fixedly connected to both of the first housing structure and the second housing structure, each of the first housing structure and the second housing structure being provide with a plurality of through holes.

5. The display assembly according to claim 4, wherein the first housing structure, the second housing structure, and the connection structure are defined as an integral structure.

6. The display assembly according to claim 4, wherein
the plurality of display modules comprise a plurality of first display modules connected to the first housing structure and a plurality of second display modules connected to the second housing structure; and
a number of through holes of the first housing structure is the same as a number of the first display modules, and a number of through holes of the second housing structure is the same as a number of the second display modules.

7. The display assembly according to claim 6, wherein
the first housing structure is provided with six through holes and the second housing structure is provided with six through holes; and
the plurality of display modules comprise six first display modules and six second display modules, wherein the six first display modules are spliced with each other, and the six second display modules are spliced with each other.

8. The display assembly according to claim 1, further comprising a first fixing member;
wherein the first fixing member is fixedly connected to the plurality of display modules, and the first fixing member is fixedly connected to the fixing housing.

9. The display assembly according to claim 8, wherein the first fixing member comprises a module cover plate and a module bracket; wherein
the module cover plate and the module bracket are respectively disposed at two sides of the display modules and configured for fixing the display modules; and
the module cover plate and the module bracket are fixedly connected to the fixing housing.

10. The display assembly according to claim 9, wherein
each of the display modules comprises a flexible circuit board; and
the module cover plate is provided with a plurality of first openings and a plurality of grooves, wherein the flexible circuit boards of part of the plurality of display modules are disposed in the first openings, and the flexible circuit boards of the other part of the plurality of display modules are disposed in the grooves.

11. The display assembly according to claim 9, wherein the module bracket is provided with a plurality of second openings, and light emitted by the plurality of display modules is emitted through the second openings.

12. The display assembly according to claim 1, further comprising a second lens structure and a second fixing member fixedly connected to the second lens structure;
wherein the second lens structure and the second fixing member are both disposed on a side of the fixing housing distal from the plurality of display modules, and the second fixing member is fixedly connected to the fixing housing.

13. The display assembly according to claim 12, wherein the first lens structure is an aspherical lens, and the second lens structure is a free-form-surface lens.

14. A method for assembling a display assembly, the method comprising:
acquiring a fixing housing, a plurality of first lens structures, and a plurality of display modules, wherein the fixing housing is provided with a plurality of through holes, the plurality of first lens structures in one-to-one correspondence with the plurality of through holes, the plurality of display modules in one-to-one correspondence with the plurality of first lens structures, and the plurality of display modules comprise at least two display modules being spliced with each other;
disposing each of the first lens structures in a corresponding through hole of the plurality of through holes; and
connecting the plurality of display modules to the fixing housing, such that light emitted by each of the display modules is emitted through a corresponding first lens structure of the plurality of first lens structures, each of the first lens structures is provided with a plurality of side walls, each of the through holes is provided with a plurality of inner walls in one-to-one correspondence with the plurality of side walls, and gaps are respectively defined between each of the side walls and a corresponding inner wall;
wherein disposing each of the first lens structures in the corresponding through hole of the plurality of through holes comprises:
acquiring a plurality of adjustment diaphragms; and
disposing an adjustment diaphragm of the plurality of adjustment diaphragms in each of the gaps, wherein one side of the adjustment diaphragm is in contact with a side wall of the first lens structure, and another side of the adjustment diaphragm is in contact with an inner wall of the through hole, and a position of the first lens structure axially along the through hole is adjusted by disposing the adjustment diaphragms with different thicknesses between the side walls of the first lens structure and the inner walls of the through hole.

15. The method for assembling the display assembly according to claim 14, wherein the method further comprises:
bonding one side of the adjustment diaphragm to the side wall of the first lens structure by an adhesive, and bonding the other side of the adjustment diaphragm to the inner wall of the through hole by an adhesive.

16. A wearable display device, comprising a casing and a display assembly; wherein
the casing is configured to encapsulate the display assembly; and
the display assembly comprises:
a fixing housing provided with a plurality of through holes;
a plurality of first lens structures in one-to-one correspondence with the plurality of through holes, wherein each of the first lens structures is disposed in a corresponding through hole of the plurality of through holes; and
a plurality of display modules in one-to-one correspondence with the plurality of first lens structures, wherein the plurality of display modules are fixedly connected to the fixing housing, the plurality of display modules comprise at least two display modules being spliced with each other, and light emitted by each of the display modules is emitted through a corresponding first lens structure of the plurality of first lens structures;

wherein each of the first lens structures is provided with a plurality of side walls, each of the through holes is provided with a plurality of inner walls in one-to-one correspondence with the plurality of side walls, and gaps are respectively defined between each of the side walls and a corresponding inner wall; and the display assembly comprises adjustment diaphragms with different thicknesses, each of the gaps being provided with an adjustment diaphragm, wherein one side of the adjustment diaphragm is in contact with a side wall of the first lens structure, and another side of the adjustment diaphragm is in contact with an inner wall of the through hole;

a position of the first lens structure axially along the through hole is adjusted by disposing the adjustment diaphragms with different thicknesses between the side walls of the first lens structure and the inner walls of the through hole.

\* \* \* \* \*